(12) United States Patent
Shimada et al.

(10) Patent No.: US 10,866,033 B2
(45) Date of Patent: Dec. 15, 2020

(54) HEAT STORAGE CONTAINER AND HEAT STORAGE DEVICE PROVIDED WITH HEAT STORAGE CONTAINER

(71) Applicant: Furukawa Electric Co., Ltd., Tokyo (JP)

(72) Inventors: Mamoru Shimada, Tokyo (JP); Hisashi Ayuzawa, Tokyo (JP); Toshiaki Nakamura, Tokyo (JP); Masami Ikeda, Tokyo (JP); Tetsu Tateishi, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 12 days.

(21) Appl. No.: 15/660,751

(22) Filed: Jul. 26, 2017

(65) Prior Publication Data

US 2017/0336151 A1    Nov. 23, 2017

Related U.S. Application Data

(63) Continuation of application No. PCT/JP2016/052230, filed on Jan. 27, 2016.

(30) Foreign Application Priority Data

Jan. 27, 2015    (JP) ................. 2015-013582

(51) Int. Cl.
*F28D 20/00* (2006.01)
*C09K 5/16* (2006.01)
(Continued)

(52) U.S. Cl.
CPC ............. *F28D 20/003* (2013.01); *C09K 5/16* (2013.01); *F28D 15/04* (2013.01); *F28D 15/046* (2013.01);
(Continued)

(58) Field of Classification Search
CPC ............. F28D 20/003; F28D 20/0056; F28D 2020/0013; F28D 2020/0069; F28D 15/04;
(Continued)

(56) References Cited

U.S. PATENT DOCUMENTS 2,019,356 A * 10/1935 Normelli ................. F25B 35/04
                                                            252/69
4,135,371 A    1/1979 Kesselring et al.
(Continued)

FOREIGN PATENT DOCUMENTS

DE    102014200803 A1    7/2014
JP        58047989 A       3/1986
(Continued)

OTHER PUBLICATIONS

English translation of First Office Action dated Oct. 31, 2018 in the corresponding CN Application No. 201680004535.3.
(Continued)

*Primary Examiner* — Travis C Ruby
(74) *Attorney, Agent, or Firm* — Dorsey & Whitney LLP (57) ABSTRACT

A heat storage system using a heat storage container includes a tubular body, a chemical heat storage material accommodated in the tubular body, and a flow channel that penetrates the tubular body in a longitudinal direction. The heat storage system includes a diffusion layer for transporting liquid from the flow channel to the chemical heat storage material. The liquid functions as a reaction medium of the chemical heat storage material. The liquid is transported to the flow channel and the diffusion layer. The liquid transported to the diffusion layer reacts with the chemical heat storage material, the chemical heat storage material generates heat, and the liquid is vaporized by the heat to become heat transport fluid.

1 Claim, 6 Drawing Sheets

(51) Int. Cl.
  *F28D 15/04* (2006.01)
  *F28D 15/06* (2006.01)
  *F28D 15/02* (2006.01)

(52) U.S. Cl.
  CPC .............. *F28D 15/06* (2013.01); *F28D 15/02* (2013.01); *F28D 2020/0013* (2013.01); *F28D 2020/0069* (2013.01); *Y02E 60/14* (2013.01)

(58) Field of Classification Search
  CPC ........ F28D 15/046; F28D 15/06; F28D 15/02; C09K 5/16
  See application file for complete search history.

(56) References Cited

U.S. PATENT DOCUMENTS

| | | | |
|---|---|---|---|
| 4,419,107 A * | 12/1983 | Roydhouse | B01D 53/64 420/498 |
| 4,457,136 A | 7/1984 | Nishizaki et al. | |
| 4,510,759 A | 4/1985 | Sakai et al. | |
| 4,548,044 A * | 10/1985 | Sakai | C01B 3/0005 123/DIG. 12 |
| 4,686,961 A * | 8/1987 | Garrison | F24S 10/90 126/635 |
| 4,693,338 A * | 9/1987 | Clerc | F01N 3/2853 181/231 |
| 4,709,558 A * | 12/1987 | Matsushita | F25B 17/08 62/480 |
| 4,881,593 A | 11/1989 | Okayasu | |
| 4,993,481 A * | 2/1991 | Kamimoto | C04B 38/0006 126/643 |
| 5,088,548 A * | 2/1992 | Lindner | F28D 20/02 165/10 |
| 5,384,101 A * | 1/1995 | Rockenfeller | B01D 53/34 422/211 |
| 5,440,899 A * | 8/1995 | De Beijer | F28D 20/003 165/104.12 |
| 5,813,248 A | 9/1998 | Zornes et al. | |
| 5,885,519 A | 3/1999 | Baldus et al. | |
| 6,235,192 B1 * | 5/2001 | Melfi | B01D 35/15 137/856 |
| 6,823,931 B1 * | 11/2004 | Stetson | C01B 3/0005 165/10 |
| 6,892,798 B2 * | 5/2005 | Lee | F28D 20/021 165/10 |
| 6,913,736 B2 * | 7/2005 | Alvin | B01D 53/22 422/211 |
| 8,839,642 B2 * | 9/2014 | Bolin | F25B 30/06 62/476 |
| 9,546,826 B1 * | 1/2017 | Carter | F28D 15/046 |
| 9,732,988 B1 * | 8/2017 | Spero | F24S 80/00 |
| 2002/0100369 A1 | 8/2002 | Kuriiwa et al. | |
| 2006/0151146 A1 * | 7/2006 | Chou | F28D 15/02 165/10 |
| 2007/0251837 A1 * | 11/2007 | Stach | B01J 20/183 206/0.7 |
| 2012/0141345 A1 * | 6/2012 | Slaten | B01J 8/0285 423/235 |
| 2015/0053367 A1 * | 2/2015 | Parkinson | F28D 20/02 165/10 |
| 2016/0169591 A1 * | 6/2016 | Thiagarajan | F28D 15/02 165/104.21 |
| 2017/0336151 A1 * | 11/2017 | Shimada | C09K 5/16 |
| 2018/0224215 A1 * | 8/2018 | Thiers | F24T 10/13 |

FOREIGN PATENT DOCUMENTS

| | | | |
|---|---|---|---|
| JP | S6176887 A | 4/1986 | |
| JP | 61295493 A | 12/1986 | |
| JP | 01167595 A | 7/1989 | |
| JP | H02-088404 A | 3/1990 | |
| JP | 02126049 A | 5/1990 | |
| JP | 0460384 A | 2/1992 | |
| JP | 09315398 A | 12/1997 | |
| JP | 2009222273 A | 10/2009 | |
| JP | 2009228952 A | 10/2009 | |
| JP | 2009257698 A | 11/2009 | |
| JP | 2011007365 A | 1/2011 | |
| JP | 201297996 A | 5/2012 | |

OTHER PUBLICATIONS

International Search Report and Written Opinion dated (dated) Apr. 26, 2016 for appln No. PCT/JP2016/052230 (including English translation of ISR).
Invitation pursuant to Rule 62a(1) dated Sep. 28, 2018 in the corresponding EP Application No, 16743381.2.
English Translation of International Preliminary Report on Patentability for PCT Application No. PCT/JP2016/052230, dated Aug. 1, 2017.
English Translation of Written Opinion of the International Searching Authority for PCT Application No. PCT/JP2016/052230, dated Apr. 26, 2016.
Extended European Search Report dated Jan. 22, 2019 in a corresponding EP application No. 16743381.2.
English translation of Notification for Granting an Invention Patent received in Chinese Application No. 201680004535.3 dated May 14, 2019.
English translation of JP Office Action in application No. 2016-572079, dated Oct. 15, 2019.
English translation of Decision to grant a patent dated Dec. 19, 2019 in JP Application No. 2016-572079.

* cited by examiner

*PRIOR ART*

HEAT STORAGE CONTAINER AND HEAT STORAGE DEVICE PROVIDED WITH HEAT STORAGE CONTAINER

CROSS REFERENCE TO RELATED APPLICATIONS

This is a continuation application of International Patent Application No. PCT/JP2016/052230 filed Jan. 27, 2016, which claims the benefit of Japanese Patent Application No. 2015-013582, filed Jan. 27, 2015, the full contents of all of which are hereby incorporated by reference in their entirety.

BACKGROUND

Technical Field

The present disclosure relates to a heat storage container using a chemical heat storage material capable of repeating heat generation and heat storage utilizing reversible reaction of releasing reaction heat by chemical reaction between a reaction medium and a chemical heat storage material, and absorbing heat by reverse reaction of the above reaction, and a heat storage device provided with the heat storage container.

Background

A chemical heat storage material has a large heat storage amount per volume, and has less heat loss even when a heat-stored chemical heat storage material is stored for a long period, and therefore the chemical heat storage material is expected to make use of storage and utilization of waste heat from an engine, an industrial plant, or the like.

Figure 8:
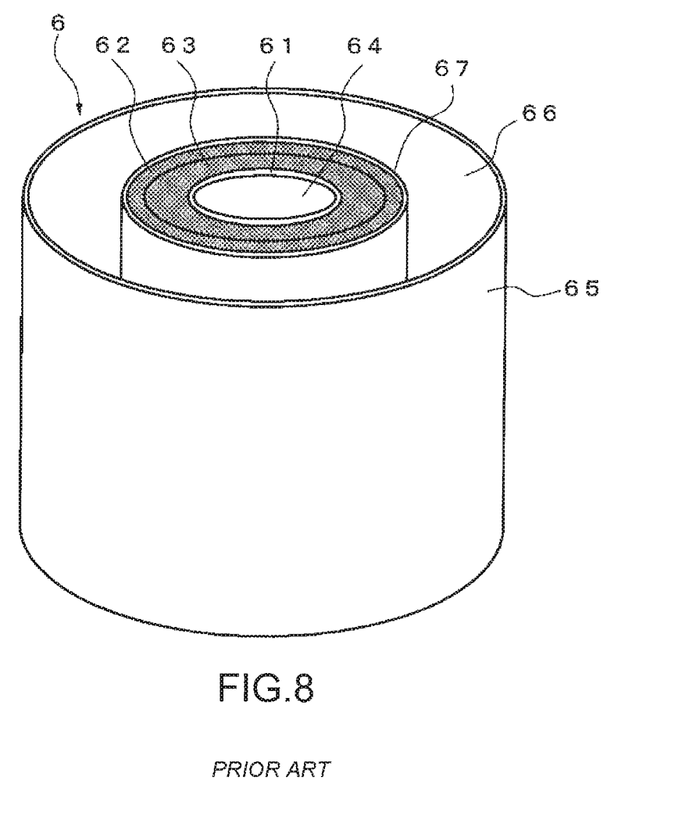
FIG. 8 is an explanatory view of a related heat storage device.

There is proposed a heat storage container 6, in which a chemical heat storage material composite containing a powder chemical heat storage material 62, and an expanding material foam 63 disposed adjacent to the chemical heat storage material 62 is accommodated between an inner tube 61 and an outer tube 67, a reaction flow channel 64 for circulating water vapor as a reactant/reaction product caused by heat storage and heat release of the chemical heat storage material 62 is formed inside the inner tube 61, and a heat exchange flow channel 66 for circulating gaseous fluid as a heat exchange medium that performs heat exchange with the chemical heat storage material 62 is provided between the outer tube 67 and an outer wall 65, as illustrated in FIG. 8, (Japanese Patent Application Publication No. 2009-228952). However, in the heat storage container 6 of Japanese Patent Application Publication No. 2009-228952, the reaction flow channel 64 that supplies water vapor, and the heat exchange flow channel 66 that supplies a heat exchange medium need to be separately provided, and therefore there is a problem that a piping configuration is complicated. Additionally, an amount of the chemical heat storage material 62 mountable on the heat storage container 6 is reduced due to the complication of the piping configuration, and therefore there is a problem that a use heat amount per unit volume (heat storage density) of the heat storage container 6 is reduced.

In addition, in the heat storage container 6 of Japanese Patent Application Publication No. 2009-228952, when gaseous fluid is used as a heat exchange medium, sensible heat is merely supplied to the gaseous fluid, and therefore there is a problem that a heat transport amount of the heat exchange medium is limited, and a problem that energy needs to be fed in a heat exchange medium storage container in order to prevent decrease of a temperature of the heat exchange medium storage container due to heat of vaporization to supply the gaseous heat exchange medium to the heat storage container 6. In addition to the above problems, when gas such as water vapor is used as a reaction fluid, there is a problem that a heat release amount from the chemical heat storage material 62 cannot be improved.

Therefore, in order to improve the heat release amount from the chemical heat storage material, use of liquid such as water as reaction fluid is considered. However, in a case where the liquid such as water is used as the reaction fluid, even when a powdery chemical heat storage material is compression-molded, a shape of the chemical heat storage material is collapsed by repeated heat generation and heat storage, which causes a problem that the chemical heat storage material flows out of the heat storage container.

Additionally, in a heat storage device in which the heat storage container using liquid such as water as the reaction fluid is disposed in a circulation system for reaction fluid, which is in an airtight state and is deaerated, there is a problem that reaction fluid vaporized in the heat storage container flows backward to a side of a reaction fluid storage tank that is provided in the heat storage device, and supplies the reaction fluid to the heat storage container, and the reaction fluid is unlikely to flow to a condenser side of the heat storage device thermally connected to a heat use destination.

SUMMARY

The present disclosure is related to provide a heat storage system and a heat storage container capable of improving a heat generation amount and a heat transport amount with a simple configuration, and a heat storage device using the above heat storage container, and a warm-up device using the above heat storage device.

According to an aspect of the present disclosure, a heat storage system using a heat storage container having a tubular body, a chemical heat storage material accommodated in the tubular body, and a flow channel that penetrates the tubular body in a longitudinal direction, includes a diffusion layer for transporting liquid from the flow channel to the chemical heat storage material, the liquid functioning as a reaction medium with the chemical heat storage material, wherein the liquid is transported to the flow channel, the liquid is transported to the diffusion layer, the liquid transported to the diffusion layer reacts with the chemical heat storage material, the chemical heat storage material generates heat, and the liquid is vaporized by the heat to become heat transport fluid.

In the above aspect, the liquid functioning as the reaction medium (liquid heat transport fluid) functions as a reaction medium contributed to endothermic reaction and exothermic reaction with the chemical heat storage material, and functions also as heat transport fluid (i.e., heat transport medium) by being phase-changed from a liquid phase to a vapor phase.

According to an aspect of the heat storage system, the heat transport fluid is transported to a heat exchanger to be phase-changed from a vapor phase to a liquid phase.

According to an aspect of the heat storage system, the diffusion layer is a structure having a capillary structure.

According to an aspect of the present disclosure, a heat storage container includes: a tubular body; a chemical heat storage material accommodated in the tubular body; a flow channel that penetrates the tubular body in a longitudinal direction; and a diffusion layer provided between the chemical heat storage material and the flow channel.

According to an aspect of the heat storage container, the flow channel penetrates the chemical heat storage material.

According to an aspect of the heat storage container, the heat storage container further includes a holding member that holds a shape of the chemical heat storage material.

According to an aspect of the heat storage container, a part or a whole of the holding member forms the diffusion layer.

According to an aspect of the heat storage container, the diffusion layer is a structure having a capillary structure.

According to an aspect of the present disclosure, a heat storage container includes: a tubular body; a chemical heat storage material accommodated in the tubular body; a first lid body that is a porous body, and is provided adjacent to the chemical heat storage material on a side of one end portion of the tubular body; a second lid body that is a porous body, and is provided adjacent to the chemical heat storage material on a side of another end portion of the tubular body; a first wick structure that is provided adjacent to inside of the chemical heat storage material between the first lid body and the second lid body, and has a capillary structure; and a flow channel that is provided inside the first wick structure, and penetrates the tubular body in a longitudinal direction.

In the above aspect, liquid functioning as a reaction medium contributed to endothermic reaction and exothermic reaction with the chemical heat storage material (liquid heat transport fluid) is supplied to the first wick structure provided adjacent to the inside of the chemical heat storage material, so that the liquid moves to a whole of the first wick structure by capillary force of the first wick structure. The liquid that moves to the whole of the first wick structure, and the chemical heat storage material chemically react, and heat stored in the chemical heat storage material is released from the chemical heat storage material, as reaction heat. Additionally, the liquid that passes through the first lid body, and the chemical heat storage material chemically react, and reaction heat is released from the chemical heat storage material. On the other hand, the liquid is similarly supplied into the flow channel from one open end portion of the flow channel provided inside the first wick structure. The liquid supplied into the flow channel receives the above reaction heat to vaporize while flowing from the one open end portion from another open end portion of the flow channel inside the flow channel.

The liquid vapor generated inside the flow channel is transported, as heat transport fluid for transporting the above reaction heat, from the other open end portion of the flow channel to a condenser thermally connected to a heat use destination. Accordingly, the flow channel is a passage for the heat transport fluid.

On the other hand, external heat of the heat storage container is movable to the chemical heat storage material accommodated in the tubular body through a wall surface of the tubular body of the heat storage container. By the heat that moves into the tubular body, chemical reaction for desorbing the reaction medium is caused from the chemical heat storage material which is bonded to the reaction medium by the chemical reaction to release the reaction heat, so that the chemical heat storage material stores the heat that moves into the tubular body.

In the above aspect, the chemical heat storage material is disposed between the wall surface of the tubular body and the first wick structure. The porous bodies which are materials of the first lid body and the second lid body each have a structure of having a plurality of through holes having such a size as to enable passing of the liquid but not to allow passing of the powdery chemical heat storage material. The "inside" in this specification means a central axis side in the longitudinal direction of the tubular body with respect to the inner surface (inner peripheral surface) of the tubular body.

According to an aspect of the present disclosure, a heat storage container includes: a tubular body; a chemical heat storage material accommodated in the tubular body; a first lid body that is a porous body, and is provided adjacent to the chemical heat storage material on a side of one end portion of the tubular body; a second lid body that is a porous body, and is provided adjacent to the chemical heat storage material on a side of another end portion of the tubular body; a first wick structure that is provided adjacent to inside of the chemical heat storage material between the first lid body and the second lid body, and has a capillary structure; and a flow channel that is provided inside the first wick structure, and is formed in a longitudinal direction of the tubular body, wherein the flow channel is blocked by the first lid body.

According to an aspect of the heat storage container, an inner tube forming the flow channel is accommodated in the tubular body. In this aspect, an inner portion of the inner tube is the flow channel.

According to an aspect of the present disclosure, a heat storage container includes: a tubular body; a chemical heat storage material accommodated in the tubular body; a first lid body that is a porous body, and is provided adjacent to the chemical heat storage material on a side of one end portion of the tubular body; a second lid body that is a porous body, and is provided adjacent to the chemical heat storage material on a side of another end portion of the tubular body; a first wick structure that is provided between the first lid body and the second lid body and between the chemical heat storage material and the tubular body, and has a capillary structure; and an inner tube that has an outer surface in contact with the chemical heat storage material, and forms a flow channel which penetrates the tubular body in a longitudinal direction.

In the above aspect, the chemical heat storage material is disposed between the first wick structure and the outer surface (outer peripheral surface) of the inner tube forming the flow channel.

According to an aspect of the present disclosure, a heat storage container includes: a tubular body; a chemical heat storage material accommodated in the tubular body; a first lid body that is a porous body, and is provided adjacent to the chemical heat storage material on a side of one end portion of the tubular body; a second lid body that is a porous body, and is provided adjacent to the chemical heat storage material on a side of another end portion of the tubular body; a first wick structure that is provided between the first lid body and the second lid body and between the chemical heat storage material and the tubular body, and has a capillary structure; and an inner tube that has an outer surface in contact with the chemical heat storage material, and forms a flow channel in a longitudinal direction of the tubular body, wherein the flow channel is blocked by the first lid body.

According to an aspect of the heat storage container, a second wick structure having a capillary structure is provided on an inner surface of the inner tube.

In this aspect, the liquid (liquid heat transport fluid) functioning as the reaction medium is supplied not only to the first wick structure but also to the second wick structure. The liquid supplied to the second wick structure receives the above reaction heat to become heat transport fluid.

According to an aspect of the heat storage container, the first wick structure is metal mesh, or a metal sintered compact formed by sintering a powdery metal material.

According to an aspect of the heat storage container, the first wick structure is a groove that is formed in an outer surface of the inner tube and has capillary force.

According to an aspect of the heat storage container, the first wick structure is a groove that is formed in an inner surface of the tubular body and has capillary force.

According to an aspect of the heat storage container, the second wick structure is metal mesh, a metal sintered compact formed by sintering a powdery metal material, or a groove that is formed in an inner surface of the inner tube and has capillary force.

According to an aspect of the present disclosure, a heat storage device includes a circulation system including: a heat storage container having a tubular body, a chemical heat storage material accommodated in the tubular body, a flow channel that penetrates the tubular body in a longitudinal direction, and a diffusion layer provided between the chemical heat storage material and the flow channel; a heat transport fluid container that is connected to one end portion of the tubular body, and accommodates liquid functioning as a reaction medium with the chemical heat storage material; a heat exchanger connected to another end portion of the tubular body; a first piping system that connects the heat storage container to the heat transport fluid container; and a third piping system that connects the heat transport fluid container to the heat exchanger, wherein the circulation system is a heat storage device that is in an airtight state, and is deaerated, and the first piping system is provided with a first valve, and the first valve is closed in accordance with a heat release temperature of the heat storage container.

According to an aspect of the heat storage device, the first valve is closed, when a predetermined time elapses from start of heat release of the chemical heat storage material, when a predetermined amount of the liquid is returned to the heat transport fluid container, or when a heat release amount of the heat exchanger reaches a predetermined value.

According to an aspect of the present disclosure, a heat storage device includes a circulation system including: a heat storage container having a tubular body, a chemical heat storage material accommodated in the tubular body, a flow channel that penetrates the tubular body in a longitudinal direction, and a diffusion layer provided between the chemical heat storage material and the flow channel; a heat transport fluid container that is connected to one end portion of the tubular body, and accommodates liquid functioning as a reaction medium with the chemical heat storage material; a heat exchanger connected to another end portion of the tubular body; a first piping system that connects the heat storage container to the heat transport fluid container; and a third piping system that connects the heat transport fluid container to the heat exchanger, wherein the circulation system is a heat storage device that is in an airtight state, and is deaerated, and the first piping system is provided with a first valve, the third piping system is provided with a second valve, and the second valve is closed in accordance with an accommodation amount of the liquid in the heat transport fluid container after the first valve is closed.

According to an aspect of the heat storage device, the first piping system is further provided with a backflow prevention member.

According to an aspect of the present disclosure, a heat storage device includes a circulation system including: a heat storage container having a tubular body, a chemical heat storage material accommodated in the tubular body, a first lid body that is a porous body, and is provided adjacent to the chemical heat storage material on a side of one end portion of the tubular body, a second lid body that is a porous body, and is provided adjacent to the chemical heat storage material on a side of another end portion of the tubular body, a first wick structure that is provided adjacent to inside of the chemical heat storage material between the first lid body and the second lid body, and has a capillary structure, and a flow channel that is provided inside the first wick structure, and penetrates the tubular body in a longitudinal direction; a heat transport fluid container that is connected to the one end portion of the tubular body, and accommodates liquid functioning as a reaction medium contributed to endothermic reaction and exothermic reaction with the chemical heat storage material; a condenser that is connected to the other end portion of the tubular body, and liquefies heat transport fluid obtained by vaporization of the liquid; and a piping system that connects the heat transport fluid container to the condenser, and supplies, to the heat transport fluid container, the liquid obtained by the condenser, wherein the circulation system is a heat storage device that is in an airtight state, and is deaerated, and a backflow suppression member that is a porous body is disposed between the heat storage container and the heat transport fluid container.

In the above aspect, the porous body which is the material of the backflow suppression member is a porous body having a large number of through holes each having such a size as to enable passing of the liquid functioning as the reaction medium.

According to an aspect of the present disclosure, a heat storage device includes a circulation system including: a heat storage container having a tubular body, a chemical heat storage material accommodated in the tubular body, a first lid body that is a porous body, and is provided adjacent to the chemical heat storage material on a side of one end portion of the tubular body, a second lid body that is a porous body, and is provided adjacent to the chemical heat storage material on a side of another end portion of the tubular body, a first wick structure that is provided adjacent to inside of the chemical heat storage material between the first lid body and the second lid body, and has a capillary structure, and a flow channel that is provided inside the first wick structure, and is formed in a longitudinal direction of the tubular body, the flow channel being blocked by the first lid body; a heat transport fluid container that is connected to the one end portion of the tubular body, and accommodates liquid functioning as a reaction medium contributed to endothermic reaction and exothermic reaction with the chemical heat storage material; a condenser that is connected to the other end portion of the tubular body, and liquefies heat transport fluid obtained by vaporization of the liquid; and a piping system that connects the heat transport fluid container to the condenser, and supplies, to the heat transport fluid container, the liquid obtained by the condenser, wherein the circulation system is a heat storage device that is in an airtight state, and is deaerated, and a backflow suppression member that is a porous body is disposed between the heat storage container and the heat transport fluid container.

According to an aspect of the heat storage device, an inner tube forming the flow channel is accommodated in the tubular body.

According to an aspect of the present disclosure is a heat storage device includes a circulation system including: a heat storage container having a tubular body, a chemical heat storage material accommodated in the tubular body, a first lid body that is a porous body, and is provided adjacent to the chemical heat storage material on a side of one end portion of the tubular body, a second lid body that is a porous body, and is provided adjacent to the chemical heat storage material on a side of another end portion of the tubular body, a first wick structure that is provided between the first lid body and the second lid body and between the chemical heat storage material and the tubular body, and has a capillary structure; and an inner tube that has an outer surface in contact with the chemical heat storage material, and forms a flow channel which penetrates the tubular body in a longitudinal direction; a heat transport fluid container that is connected to the one end portion of the tubular body, and accommodates liquid functioning as a reaction medium contributed to endothermic reaction and exothermic reaction with the chemical heat storage material; a condenser that is connected to the other end portion of the tubular body, and liquefies heat transport fluid obtained by vaporization of the liquid; and a piping system that connects the heat transport fluid container to the condenser, and supplies, to the heat transport fluid container, the liquid obtained by the condenser, wherein the circulation system is a heat storage device that is in an airtight state, and is deaerated, and a backflow suppression member that is a porous body is disposed between the heat storage container and the heat transport fluid container.

According to an aspect of the present disclosure, a heat storage device includes a circulation system including: a heat storage container having a tubular body, a chemical heat storage material accommodated in the tubular body, a first lid body that is a porous body, and is provided adjacent to the chemical heat storage material on a side of one end portion of the tubular body, a second lid body that is a porous body, and is provided adjacent to the chemical heat storage material on a side of another end portion of the tubular body, a first wick structure that is provided between the first lid body and the second lid body and between the chemical heat storage material and the tubular body, and has a capillary structure, and an inner tube that has an outer surface in contact with the chemical heat storage material, and forms a flow channel in a longitudinal direction of the tubular body, the flow channel being blocked by the first lid body; a heat transport fluid container that is connected to the one end portion of the tubular body, and accommodates liquid functioning as a reaction medium contributed to endothermic reaction and exothermic reaction with the chemical heat storage material; a condenser that is connected to the other end portion of the tubular body, and liquefies heat transport fluid obtained by vaporization of the liquid; and a piping system that connects the heat transport fluid container to the condenser, and supplies, to the heat transport fluid container, the liquid obtained by the condenser, wherein the circulation system is a heat storage device that is in an airtight state, and is deaerated, and a backflow suppression member that is a porous body is disposed between the heat storage container and the heat transport fluid container.

According to an aspect of the heat storage device, the backflow suppression member is integrated with the first lid body.

According to an aspect of the heat storage device, heat transport fluid supplying means is provided between the backflow suppression member and the heat transport fluid container.

According to an aspect of the heat storage device, heat transport fluid supplying means is provided between the condenser and the heat transport fluid container.

According to an aspect of the present disclosure, a warm-up device uses the above heat storage device.

According to an aspect of the present disclosure, a chemical heat storage material processing method includes the steps of: molding a chemical heat storage material in a predetermined shape; inserting a core rod into the chemical heat storage material; inserting a powdery metal material between an outer surface of the core rod and an inner surface of a hole portion of the chemical heat storage material; and heating or sintering the powdery metal material.

According to the aspect of the present disclosure, the liquid functioning as the reaction medium (liquid heat transport fluid) functions as a reaction medium to the chemical heat storage material, and functions also as the heat transport fluid (heat transport medium) for transporting heat stored in the chemical heat storage material to the heat use destination, and therefore a route for the reaction medium and a route for the heat transport fluid do not need to be separate respective routes, and can be brought together into one system. Thus, the route for the reaction medium and the route for the heat transport can be brought together into one system, and therefore it is possible to simplify a structure of a piping route. Additionally, not vapor but liquid reacts with the chemical heat storage material, and therefore it is possible to obtain excellent heat storage density.

According to the aspect of the present disclosure, the diffusion layer is provided between the chemical heat storage material and the flow channel, and therefore the liquid functioning as the reaction medium (liquid heat transport fluid) is smoothly and reliably diffused over the whole of the chemical heat storage material through the diffusion layer. Accordingly, heat generation speed and heat generation efficiency of the chemical heat storage material are further improved.

According to the aspect of the present disclosure, one end portion of the chemical heat storage material is covered with the first lid body, another end portion of the chemical heat storage material are covered with the second lid body, and a side surface portion of the inside of the chemical heat storage material between the first lid body and the second lid body is covered with the first wick structure, and therefore even when liquid such as water is used as the reaction medium, it is possible to prevent shape collapse of the molded chemical heat storage material. Additionally, the shape of the chemical heat storage material is maintained by the first lid body, the second lid body, and the first wick structure, and therefore the chemical heat storage material can be prevented from flowing to outside of the heat storage container. Furthermore, according to the aspect of the present disclosure, the first wick structure is disposed inside the chemical heat storage material, and therefore the reaction heat released from the chemical heat storage material can be reliably prevented from being released to the outside of the heat storage container through the wall surface of the tubular body.

According to the aspect of the present disclosure, the inner tube is disposed in the tubular body, and therefore the first wick structure can be protected from external environment by the inner tube. Furthermore, it is possible to reliably maintain the shape of the flow channel by the inner tube.

According to the aspect of the present disclosure, the second wick structure is disposed on the inner surface (inner peripheral surface) of the inner tube, and therefore the liquid functioning as the reaction medium is widely diffused on the inner surface of the inner tube by capillary force of the second wick structure. Accordingly, the liquid supplied into the inner tube, namely, to the flow channel can be more effectively vaporized. Additionally, the liquid is absorbed in the second wick structure, so that a contact area of the liquid heat transport fluid to the reaction heat is increased, and therefore it is possible to more effectively vaporize the liquid heat transport fluid.

According to the aspect of the present disclosure, the first valve is provided in the first piping system that connects the heat storage container to the heat transport fluid container, and the first valve is closed in accordance with the heat release temperature of the heat storage container, and therefore it is possible to precisely control endothermic reaction and exothermic reaction with the chemical heat storage material.

According to the aspect of the present disclosure, the backflow suppression member that is the porous body is disposed inside the pipe between the heat storage container and the heat transport fluid container, and therefore it is possible to prevent backflow of the liquid vaporized inside the heat storage container toward the heat transport fluid container, and it is possible to improve heat transport efficiency of the heat storage device.

BRIEF DESCRIPTION OF DRAWINGS

FIG. 1 A is a sectional view of a side surface of a heat storage container according to a first embodiment of the present disclosure.

FIG. 1 B is an A-A' sectional view of the heat storage container in FIG. 1 A.

FIG. 2 A is a sectional view of a side surface of a heat storage container according to a second embodiment of the present disclosure.

FIG. 2 B is a B-B' sectional view of the heat storage container in FIG. 2 A.

DETAILED DESCRIPTION

Further features of the present disclosure will become apparent from the following detailed description of exemplary embodiments with reference to the accompanying drawings.

Figure 1A:
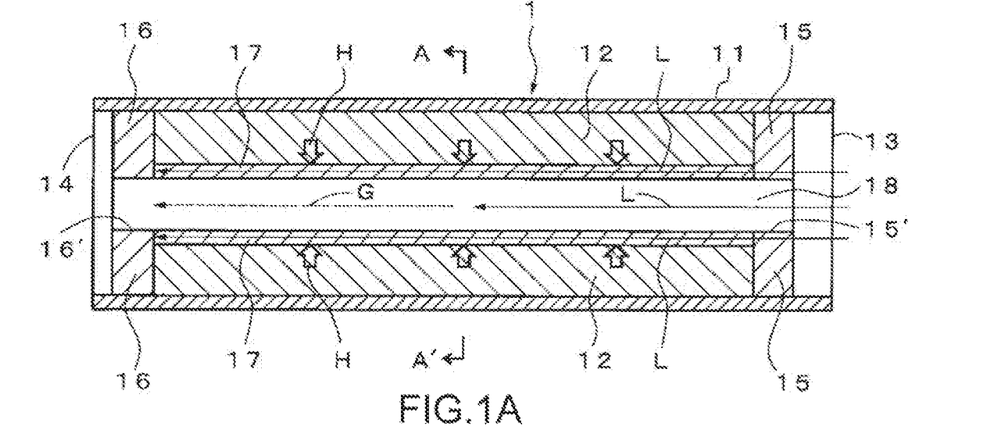

Hereinafter, a heat storage container according to a first embodiment of the present disclosure will be described with reference to the drawings. As illustrated in FIG. 1 A, a heat storage container 1 according to the first embodiment includes a cylindrical body 11 that is a tubular body having both open end portions, and a chemical heat storage material 12 disposed inside the cylindrical body 11. Additionally, the heat storage container 1 includes a first lid body 15 that is disposed adjacent to the chemical heat storage material 12 on a side of one end portion 13 of the cylindrical body 11, and is composed of a porous body, a second lid body 16 that is disposed adjacent to the chemical heat storage material 12 on a side of another end portion 14 of the cylindrical body 11, and is composed of a porous body, and a first wick structure 17 that is disposed adjacent to an inner side surface of the chemical heat storage material 12 between the first lid body 15 and the second lid body 16, is a diffusion layer for transporting liquid, and has a capillary structure.

Figure 1B:
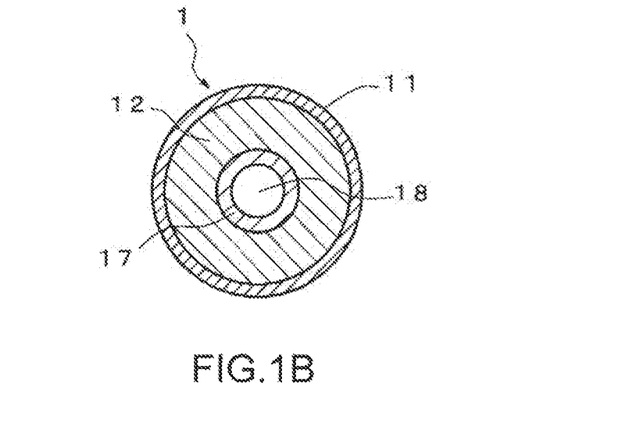

As illustrated in FIG. 1 B, a radial cross-section of the cylindrical body 11 has a circular shape. The chemical heat storage material 12 has a form in which powder is compression-molded cylindrically, and a radial cross-section of the chemical heat storage material 12 has a circular shape. A central axis of the cylindrical body 11 and a central axis of the cylindrical chemical heat storage material 12 are coaxially disposed.

The first lid body 15 and the second lid body 16 each has a circular shape having a hole portion formed at a central portion, a wall surface of a hole portion 15' of the first lid body 15 and a wall surface of a hole portion 16' of the second lid body 16 are a part of a wall surface of a flow channel 18 described below, and form end portions of the flow channel 18. Accordingly, the hole portions 15', 16' each have a shape and a size corresponding to a shape and a size of a radial cross-section of the flow channel 18.

As illustrated in FIG. 1 A and FIG. 1 B, in the heat storage container 1, the first lid body 15, the second lid body 16, the first wick structure 17, and an inner surface of the cylindrical body 11 are each in direct contact with a facing region of the chemical heat storage material 12. The first lid body 15 covers an end surface of one end portion of the chemical heat storage material 12, the second lid body 16 covers another end portion of the chemical heat storage material, the first wick structure 17 covers the inner side surface of the chemical heat storage material 12, and the inner surface of the cylindrical body 11 covers an outer side surface of the chemical heat storage material 12. The first lid body 15, and the second lid body 16 are accommodated in inner portions with respect to the one end portion 13 and the other end portion 14 of the cylindrical body 11, respectively. Additionally, the first wick structure 17 is connected to a peripheral edge portion of the hole portion 15' in a surface of the first lid body 15, and a peripheral edge portion of the hole portion 16' in a surface of the second lid body 16. More specifically, one end portion of the first wick structure 17 is in contact with the first lid body 15 having the hole portion 15' forming one open end portion of the flow channel 18, and another end portion of the first wick structure 17 is in contact with the second lid body 16 having the hole portion 16' forming another open-end portion of the flow channel 18. Accordingly, in the heat storage container 1, the chemical heat storage material 12 is covered in contact with the first lid body 15, the second lid body 16, the first wick structure 17, and the inner surface of the cylindrical body 11.

In the heat storage container 1, the first wick structure 17 has a cylindrical shape, and the radial cross-section has a circular shape. That is, inside the first wick structure 17, a space portion that penetrates the cylindrical body 11 in a longitudinal direction, that is, the flow channel 18 is provided. Accordingly, an inner peripheral surface of the first wick structure 17 becomes the wall surface of the flow channel 18.

The chemical heat storage material 12 is covered in contact with the first lid body 15, the second lid body 16, the first wick structure 17, and the inner surface of the cylindrical body 11, and therefore even when liquid such as water is used as a reaction medium, it is possible to maintain the shape of the compression-molded chemical heat storage material 12. Accordingly, the first wick structure 17 functions also as a holding member for the shape of the chemical heat storage material 12. Additionally, liquid heat transport fluid L that is liquid functioning as the reaction medium, and functions as the reaction medium is supplied to the one end portion of the chemical heat storage material 12 through the first lid body 15. Furthermore, the liquid heat transport fluid L functioning as the reaction medium is smoothly supplied from the one end portion of the chemical heat storage material 12 to a whole of the inner side surface of the chemical heat storage material 12 by capillary force which the first wick structure 17 has. That is, by the capillary force of the first wick structure 17, the liquid heat transport fluid L functioning as the reaction medium can be smoothly and reliably flow from the one end portion to the other end portion of the chemical heat storage material 12 along the longitudinal direction of the first wick structure 17, that is, along the longitudinal direction of the cylindrical body 11.

The first wick structure 17 is in contact with the inner peripheral surface of the chemical heat storage material 12, and therefore the liquid heat transport fluid L functioning as the reaction medium, which is absorbed in the first wick structure 17, and the chemical heat storage material 12 quickly chemically react with each other, and the chemical heat storage material 12 releases reaction heat H. Additionally, the liquid heat transport fluid L functioning as the reaction medium, which passes through the first lid body 15, and the chemical heat storage material 12 chemically react with each other, and the chemical heat storage material 12 releases the reaction heat H.

The first wick structure 17 thermally connected to the chemical heat storage material 12 receives the reaction heat H released from the chemical heat storage material 12 by contact with the inner peripheral surface of the chemical heat storage material 12. The reaction heat H received by the first wick structure 17 moves to the liquid heat transport fluid L functioning as the reaction medium similarly, which is supplied from one end portion of the flow channel 18, and is inside the flow channel 18. Consequently, the liquid heat transport fluid L functioning as the reaction medium vaporizes while moving from the one end portion from another end portion inside the flow channel 18. The heat transport fluid functioning as the reaction medium, which is vaporized inside the flow channel 18 (i.e., vapor G of heat transport fluid functioning as a reaction medium) is released from the other end portion of the flow channel 18 to outside of the heat storage container 1, and further transports the reaction heat H toward the heat use destination. Thus, the flow channel 18 functions as a passage for the vapor G being the heat transport fluid functioning as the reaction medium. In the heat storage container 1, the radial cross-section of the flow channel 18 has a circular shape, and a central axis of the flow channel 18 is disposed coaxially with the central axis of the cylindrical body 11.

Thus, the liquid heat transport fluid L functioning as the reaction medium functions as a reaction medium to the chemical heat storage material, and functions as the heat transport fluid for transporting heat stored in the chemical heat storage material to the heat use destination, and therefore a route for the reaction medium and a route for the heat transport fluid (heat transport medium) do not need to be separate respective routes, and a structure of piping route can be simplified. Additionally, not vapor but liquid reacts with the chemical heat storage material, and therefore it is possible to obtain excellent heat storage density.

The first lid body 15 and the second lid body 16 each are a porous body having through holes each having such a size as to enable passing of the liquid heat transport fluid L functioning as the reaction medium but not to allow passing of powder of the chemical heat storage material 12. As long as the size (mean opening diameter) of the through holes of the porous body is a size having the above function, the size is not particularly limited, and is, for example, 50 micrometers or less. Additionally, a material of each of the first lid body 15 and the second lid body 16 is not particularly limited, and examples of the material can include a sintered compact of metal powder such as copper powder, metal mesh, foam metal, metallic foil provided with a through hole, a metal plate provided with a through hole, and the like.

As long as the first wick structure 17 has a capillary structure, the first wick structure 17 is not particularly limited. For example, a member such as a metal sintered compact formed by sintering a powdery metal material, and metal mesh can be used. Additionally, the first wick structure 17 may be a body separated from the first lid body 15 and the second lid body 16 like the heat storage container 1, and in a case where the sintered compact of the metal powder such as the copper powder, and the metal mesh is used as the first wick structure 17, the first wick structure 17 may be integrated with the first lid body 15 and the second lid body 16.

A material of the cylindrical body 11 is not particularly limited, and examples of the material can include copper, aluminum, stainless steel, and the like. The chemical heat storage material 12 and the liquid heat transport fluid L functioning as the reaction medium are not particularly limited, and any known member can be used. For example, combination of CaO and/or MgO which is the chemical heat storage material, and $H_2O$ of the liquid heat transport fluid functioning as the reaction medium, combination of CaO and/or MgO, and $CO_2$ which is the liquid heat transport fluid functioning as the reaction medium can be used.

Figure 2A:
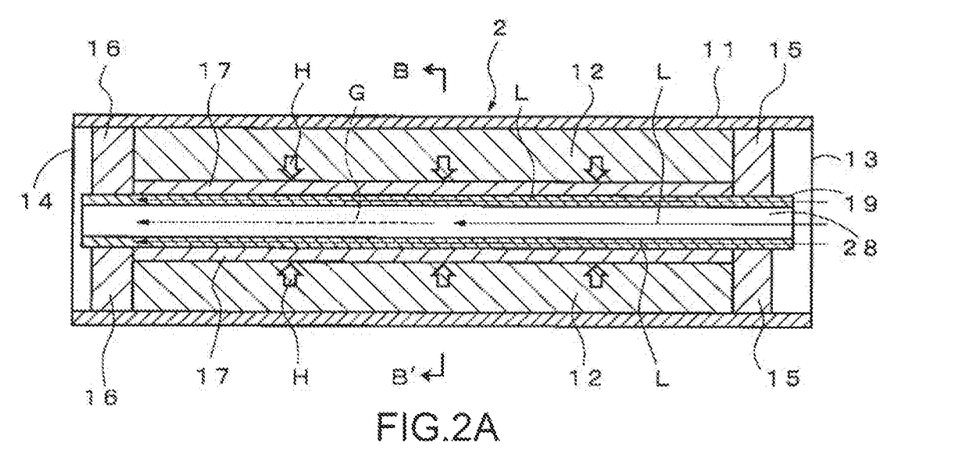
Figure 2B:
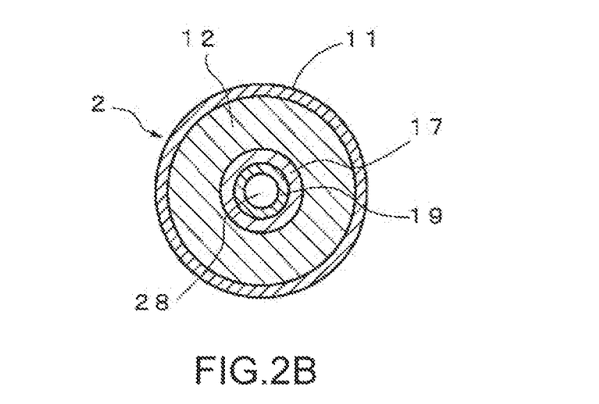

Now, a heat storage container according to a second embodiment of the present disclosure will be described with reference to the drawings. Description will be made while components identical with the component of the heat storage container 1 are denoted by the same reference numerals. As illustrated in FIG. 2 A and FIG. 2 B, in a heat storage container 2 according to the second embodiment, an inner tube 19 that is a tubular material having both open end portions is inserted through an inner peripheral surface of the first wick structure 17 having a cylindrical longitudinal shape and a circular radial cross-section. Accordingly, in the heat storage container 2 according to the second embodiment, an inner surface of the inner tube 19 becomes a wall surface of the flow channel 28. Additionally, the inner peripheral surface of the first wick structure 17 is in contact with an outer surface of the inner tube 19, so that the inner tube 19 is thermally connected to the first wick structure 17.

A radial cross-section of the inner tube 19 has a circular shape, a central axis of the inner tube 19 (i.e., a central axis of the flow channel 28) is disposed coaxially with a central axis of a cylindrical body 11. Additionally, the respective end portions of the inner tube 19 are located at inner portions with respect to one end portion 13 and another end portion 14 of the cylindrical body 11.

In the heat storage container 2 according to the second embodiment, reaction heat H received by the first wick structure 17 moves, through the inner tube 19, to liquid heat transport fluid L functioning as a reaction medium, which is supplied from one end portion of the flow channel 28, and is inside the flow channel 28. Additionally, the inner tube 19 is inserted through the inner peripheral surface of the first wick structure 17, so that an inner side surface of the first wick structure 17 is protected from external environment.

Furthermore, shape change of the first wick structure 17 can be prevented by the inner tube 19, and therefore it is possible to reliably maintain a shape of the flow channel 28.

A material of the inner tube 19 is not particularly limited, and examples of the material can include copper, aluminum, stainless steel, and the like.

Figure 3:
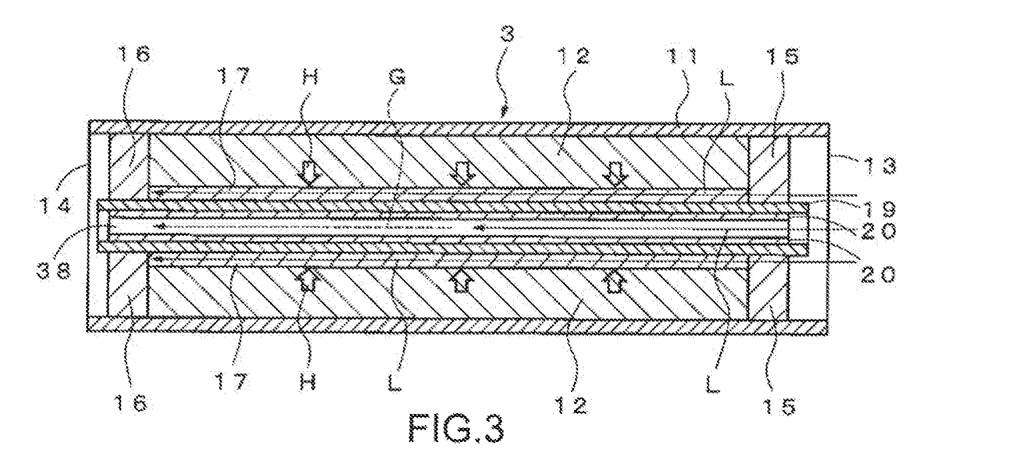
FIG. 3 is a sectional view of a side surface of a heat storage container according to a third embodiment of the present disclosure.

Now, a heat storage container according to a third embodiment of the present disclosure will be described with reference to the drawings. Description will be made while components identical with the component of the heat storage containers 1, 2 are denoted by the same reference numerals. As illustrated in FIG. 3, in a heat storage container 3 according to the third embodiment, a second wick structure 20 having a capillary structure is provided on an inner surface of an inner tube 19.

In the heat storage container 3 according to the third embodiment, a flow channel 38 that penetrates a cylindrical body 11 in a longitudinal direction is provided inside the second wick structure 20. An inner peripheral surface of the second wick structure 20 becomes a wall surface of the flow channel 38. Additionally, both end portions of the second wick structure 20 become both open end portions of the flow channel 38. The second wick structure 20 has a cylindrical shape, and has a circular radial cross-section. A central axis of the second wick structure 20 (i.e., a central axis of the flow channel 38) is disposed coaxially with a central axis of the cylindrical body 11.

In the heat storage container 3 according to the third embodiment, the inner surface of the inner tube 19 and an outer peripheral surface of the second wick structure 20 are in contact with each other, so that the second wick structure 20 is thermally connected to the inner tube 19. In the heat storage container 3, reaction heat H received by the first wick structure 17 moves to liquid heat transport fluid L functioning as a reaction medium, which is supplied from one end portion of the flow channel 38, and is inside the flow channel 38, through the inner tube 19 and the second wick structure 20.

In the heat storage container 3, the liquid heat transport fluid L functioning as the reaction medium is widely diffused on the inner surface of the inner tube 19 by capillary force of the second wick structure 20. Accordingly, the heat transport fluid L functioning as the reaction medium supplied to the flow channel 38 can be more effectively vaporized. Additionally, the liquid heat transport fluid L functioning as the reaction medium is absorbed in the second wick structure 20, so that a contact area of the liquid heat transport fluid L functioning as the reaction medium to the reaction heat H is increased, and therefore it is possible to more effectively vaporize the liquid heat transport fluid L functioning as the reaction medium inside the flow channel 38.

As long as the second wick structure 20 has a capillary structure, the second wick structure 20 is not particularly limited. For example, a member such as a metal sintered compact formed by sintering a powdery metal material, and metal mesh can be used.

Figure 4:
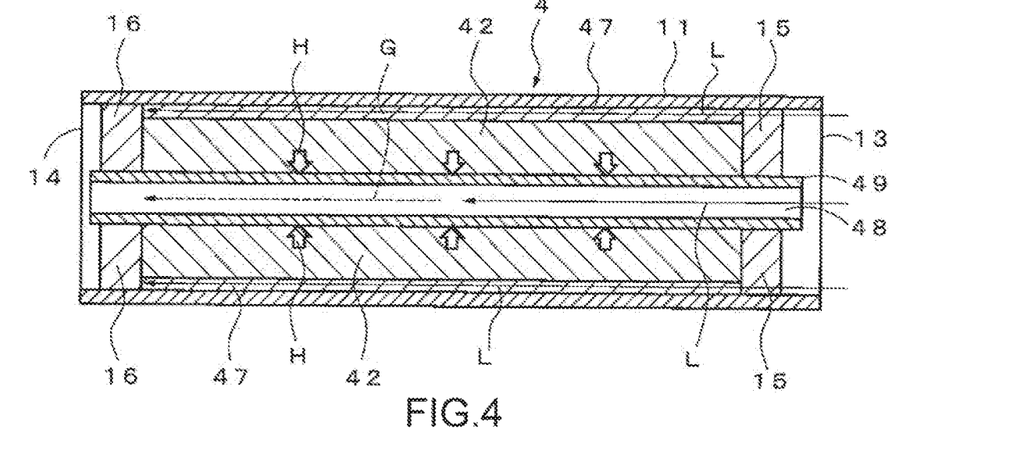
FIG. 4 is a sectional view of a side surface of a heat storage container according to a fourth embodiment of the present disclosure.

Now, a heat storage container according to a fourth embodiment of the present disclosure will be described with reference to the drawings. Description will be made while components identical with the component of the heat storage containers 1, 2, 3 are denoted by the same reference numerals. As illustrated in FIG. 4, in a heat storage container 4 according to the fourth embodiment, a first wick structure 47 is disposed between a chemical heat storage material 42 and a cylindrical body 11. An outer peripheral surface of the first wick structure 47 is disposed in contact with an inner surface of the cylindrical body 11. Additionally, an inner tube 49 that is a tubular material having both open end portions is inserted through an inner peripheral surface of the chemical heat storage material 42 having a cylindrical longitudinal shape and a circular radial cross-section. Accordingly, in the heat storage container 4 according to the fourth embodiment, an inner surface of the inner tube 49 becomes a wall surface of a flow channel 48. Additionally, the inner peripheral surface of the chemical heat storage material 42 and an outer surface of the inner tube 49 are in contact with each other, so that the chemical heat storage material 42 and the inner tube 49 are thermally connected to each other.

Even in arrangement of the first wick structure 47 of the heat storage container 4 according to the fourth embodiment, liquid heat transport fluid L functioning as a reaction medium can be supplied to the chemical heat storage material 42, similarly to arrangement of the first wick structure 17 of the heat storage container 1 according to the first embodiment.

Figure 5:
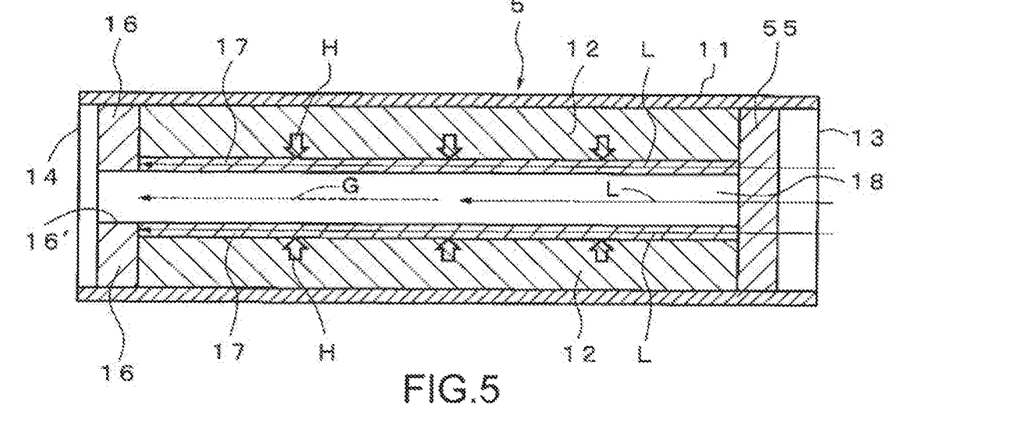
FIG. 5 is a sectional view of a side surface of a heat storage container according to a fifth embodiment of the present disclosure.

Now, a heat storage container according to a fifth embodiment of the present disclosure will be described with reference to the drawings. Description will be made while components identical with the component of the heat storage containers 1, 2, 3, 4 are denoted by the same reference numerals. As illustrated in FIG. 5, in a heat storage container 5 according to the fifth embodiment, a first lid body 55 having no hole portion 15' is used in place of the first lid body 15 having the hole portion 15' that is a part of the wall surface of the flow channel 18, and forms the end portions of the flow channel 18, of the heat storage container 1 according to the first embodiment.

Accordingly, in the heat storage container 5, one end portion of a flow channel 18 does not have an open form, and is covered with a first lid body 55. That is, the one end portion of the flow channel 18 is blocked by a surface portion of the first lid body 55 that is a porous body. Even in the above form, liquid heat transport fluid L functioning as a reaction medium can pass through the first lid body 55 that is the porous body, and therefore the liquid heat transport fluid L functioning as the reaction medium can be supplied to the flow channel 18. Additionally, when the liquid heat transport fluid L functioning as the reaction medium is supplied to the heat storage container 5 from a side of one end portion 13 of a cylindrical body 11, while the porous body forming the first lid body 55 is impregnated in the liquid heat transport fluid L functioning as the reaction medium, the liquid heat transport fluid L functioning as the reaction medium passes through the first lid body 55 to be supplied to the flow channel 18 of the heat storage container 5. As a result, the first lid body 55 that is the porous body can also function as a member for preventing backflow of vapor G of the heat transport fluid functioning as the reaction medium inside the flow channel 18.

Now, a usage example of the heat storage container according to each of the above embodiments of the present disclosure will be described. Herein, description will be made while the heat storage container 1 according to the first embodiment is taken as an example. When the heat storage container 1 is installed in, for example, fluid which is a heat recovery target, an outer surface of the cylindrical body 11 receives heat from the above fluid to recover the received heat into the heat storage container 1. The heat recovered from the fluid through the outer surface of the cylindrical body 11 comes into contact with the inner surface of the cylindrical body 11 to be transferred to the thermally connected chemical heat storage material 12, and the chemical heat storage material 12 stores the transferred heat. When the chemical heat storage material 12 stores the heat, the chemical heat storage material 12 releases heat transport fluid functioning as a reaction medium as gas of the reaction medium.

On the other hand, liquid heat transport fluid L functioning as a reaction medium, which passes through the first lid body 15, and liquid heat transport fluid L functioning as a reaction medium, which is supplied to the first wick structure 17, each chemically react with the chemical heat storage material 12 storing the heat, as a reaction medium, so that the heat stored in the chemical heat storage material 12 is released from the chemical heat storage material 12 as reaction heat H.

The reaction heat H released from the chemical heat storage material 12 is transferred to the liquid heat transport fluid L functioning as a reaction medium, which is supplied from the one end portion of the flow channel 18 through the first wick structure 17, and is in the flow channel 18, the liquid heat transport fluid L functioning as the reaction medium receives the reaction heat H to be vaporized inside the flow channel 18. Vapor G of the heat transport fluid functioning as the reaction medium, which is vaporized inside the flow channel 18, is transported from the heat storage container 1 toward the heat use destination, as a heat medium for transporting the reaction heat H, namely, the heat transport fluid.

In order to improve heat recovery efficiency from the fluid as the heat recovery target of the heat storage container 1, heat exchange means, for example, a fin or the like may be mounted on the outer surface of the cylindrical body 11.

Now, a manufacturing method example of the heat storage container of the present disclosure will be described. Herein, description will be made while the heat storage container 2 according to the second embodiment is taken as an example. The manufacturing method of the heat storage container 2 is not particularly limited. However, for example, the cylindrically molded chemical heat storage material 12 is first inserted along the inner surface of the cylindrical body 11 in the longitudinal direction of the cylindrical body 11. Next, the inner tube 19 is inserted along the longitudinal direction of the cylindrical body 11, and a material that becomes the first wick structure 17 (for example, a powdery metal material) is filled in a gap portion formed between the outer surface of the inner tube 19 and the inner peripheral surface of the chemical heat storage material 12. Then, a material that becomes the first lid body 15 (for example, a powdery metal material), and a material that becomes the second lid body 16 (for example, a powdery metal material) are filled in the one end portion of the chemical heat storage material 12, and another end portion of the chemical heat storage material 12, respectively. The above materials are filled, and thereafter a heating process is performed, so that it is possible to manufacture the heat storage container 2 having the chemical heat storage material 12, the inner side surface, the end portion, and the other end portion of which are covered with the first wick structure 17, the first lid body, and the second lid body, respectively.

The heat storage container 2 manufactured as described above may be further flattened to become a flat heat storage container as needed.

In a case where the heat storage container 3 according to the third embodiment, which has the second wick structure 20 on the inner surface of the inner tube 19, is manufactured, a core rod is further inserted into the inner tube 19 along a longitudinal direction of the inner tube 19, and a material that becomes the second wick structure 20 (for example, a powdery metal material) is filled in a gap portion formed between an outer peripheral surface of the core rod and the inner surface of the inner tube, and thereafter the above heating process is performed. After the heating process, the core rod is pulled out of the inner tube 19, so that the second wick structure 20 can be formed on the inner surface of the inner tube 19.

As a method for providing a diffusion layer (first wick structure 17) in the chemical heat storage material 12, for example, a method described below can be employed. First, the chemical heat storage material 12 is molded into a shape in which a hole portion having a plurality of openings mutually inserted are provided, and a core rod having a shape corresponding to a route of the hole portion is inserted from the opening to the molded chemical heat storage material 12. Then, a material that becomes the diffusion layer (first wick structure 17) (for example, a powdery metal material) is inserted between an outer surface of the above core rod and an inner surface of the above hole portion, and the above material is heated or sintered. Thereafter, the above core rod is pulled out, so that the diffusion layer can be provided on a surface of the chemical heat storage material 12.

Now, a heat storage device using the heat storage container of the present disclosure will be described with reference to the drawings. Herein, description will be made while a heat storage device using the heat storage container 2 according to the second embodiment is taken as an example.

Figure 6:
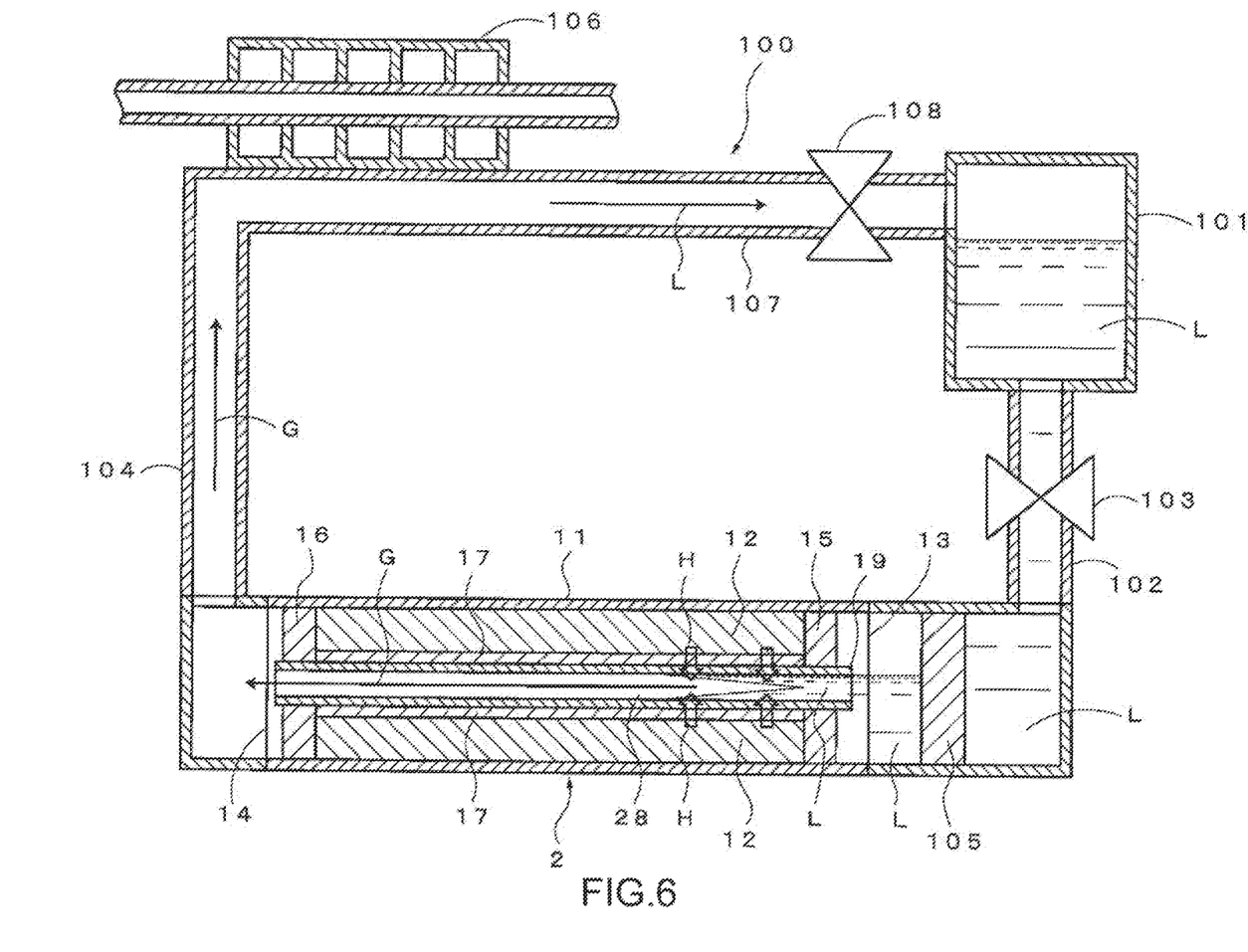
FIG. 6 is an explanatory view of a heat storage device according to a first embodiment of the present disclosure.

As illustrated in FIG. 6, in a heat storage device 100 according to a first embodiment of the present disclosure, an one open end portion 13 of a cylindrical body 11 of a heat storage container 2 is connected to a heat transport fluid container 101 that accommodates liquid heat transport fluid L functioning as a reaction medium contributed to endothermic reaction and exothermic reaction of a chemical heat storage material 12, through a first piping system 102 provided with a first valve 103 that is a heat transport fluid supplying means. The heat transport fluid container 101 is installed at a higher position than the heat storage container 2, and therefore the first valve 103 is opened, so that the liquid heat transport fluid L functioning as the reaction medium flows from the heat transport fluid container 101 into the heat storage container 2, namely, a first wick structure 17 and inside of an inner tube 19 (i.e., flow channel 28) through the one open end portion 13 of the cylindrical body 11. The number of the heat storage containers 2 installed in the heat storage device 100 is not limited to one. The heat storage device 100 may be configured such that a plurality of the heat storage containers 2 are incorporated in a header portion (not illustrated) and connected in parallel.

The liquid heat transport fluid L functioning as the reaction medium that flows into the first wick structure 17 reacts with the chemical heat storage material 12, as the reaction medium, so that reaction heat H is released from the chemical heat storage material 12. On the other hand, the liquid heat transport fluid L functioning as the reaction medium, which flows into the flow channel 28 of the heat storage container 2, receives the reaction heat H released from the chemical heat storage material 12 to vaporize while moving from one end portion to another end portion of the flow channel 28, and becomes vapor G of heat transport fluid functioning as a reaction medium. The vapor G of the heat transport fluid functioning as the reaction medium, which vaporizes inside the flow channel 28, is released as the heat transport fluid from another open end portion 14 of the cylindrical body 11, namely, from the heat storage container 2 to a second piping system 104 through the other end portion of the flow channel 28.

As illustrated in FIG. 6, in the first piping system 102, a partition wall 105 that is a porous body is disposed as a backflow suppression member between the first valve 103 and the heat storage container 2. By the partition wall 105, the first piping system 102 is separated into a side close to the heat storage container 2 and a side close to the heat transport fluid container 101. The porous body which is a material of the partition wall 105 has a through hole having such a size as to enable passing of the liquid heat transport fluid L functioning as the reaction medium. Accordingly, when the first valve 103 is opened, while the porous body forming the partition wall 105 is being impregnated in the liquid heat transport fluid L functioning as the reaction medium, the liquid heat transport fluid L functioning as the reaction medium passes through the partition wall 105 from the heat transport fluid container 101 to be supplied to the heat storage container 2. As a result, the partition wall 105 of the porous body functions as a member for preventing backflow of the vapor G of the heat transport fluid functioning as the reaction medium inside the flow channel 28. Additionally, the backflow suppression member is provided between the first valve 103 and the heat storage container 2, so that it is possible to prevent freezing of the first valve 103.

As long as the size (mean opening diameter) of the through holes of the porous body forming partition wall 105 is a size having the above function, the size is not particularly limited, and is, for example, 50 micrometers or less. Additionally, a material of the porous body is not particularly limited, and the same materials as the first lid body 15 and the second lid body 16 can be used as the material of the porous body. More specifically, examples of the material can include a sintered compact of metal powder such as copper powder, metal mesh, foam metal, metallic foil provided with a through hole, a metal plate provided with a through hole, and the like.

As long as the above backflow suppression member is a member capable of preventing the backflow of the vapor G of the heat transport fluid functioning as the reaction medium inside the flow channel 28, the backflow suppression member is not limited to the partition wall 105 which is the porous body. For example, a member having a single hole portion, a straightening vane, or the like may be used.

As illustrated in FIG. 6, the other open end portion 14 of the cylindrical body 11 of the heat storage container 2 is connected to a condenser 106 which is a heat exchanger, through the second piping system 104. The vapor G of the heat transport fluid functioning as the reaction medium, which is released from the other end portion 14 to the second piping system 104 of the cylindrical body 11 moves toward the condenser 106 inside the second piping system 104, and is introduced into the condenser 106. The condenser 106 cools the vapor G of the heat transport fluid functioning as the reaction medium, which is introduced from the second piping system 104, to liquefy the cooled vapor G.

The vapor G of the heat transport fluid functioning as the reaction medium, which is introduced into the condenser 106 is condensed by the condenser 106 to become the liquid heat transport fluid L functioning as the reaction medium, and latent heat is released. The latent heat released by the condenser 106 is transported to the heat use destination (not illustrated) thermally connected to the condenser 106. Thus, in the heat storage device 100, the reaction medium of the chemical heat storage material 12 is used as heat transport fluid that transports, to the heat use destination, the reaction heat released from the chemical heat storage material 12.

Furthermore, the heat storage device 100 includes a third piping system 107 that connects the condenser 106 and the heat transport fluid container 101. The liquid heat transport fluid L functioning as the reaction medium which is generated by the condenser 106 is returned from the condenser 106 to the heat transport fluid container 101 through the third piping system 107. Additionally, the third piping system 107 is provided with a second valve 108 that is heat transport fluid supplying means.

In the heat storage device 100, a circulation system, in which the heat transport fluid functioning as the reaction medium circulates from the heat transport fluid container 101 to the heat storage container 2, from the heat storage container 2 to the condenser 106, and from the condenser 106 to the heat transport fluid container 101 by the first piping system 102, the second piping system 104, and the third piping system 107, respectively, is formed. The circulation system is in an airtight state, and is deaerated. That is, the circulation system has a loop-shaped heat pipe structure. Additionally, the heat transport fluid container 101 is installed at a higher position than the heat storage container 2. Furthermore, the partition wall 105 that prevents the backflow of the vapor G of the heat transport fluid functioning the reaction medium is disposed in the first piping system 102 disposed between the first valve 103 and the heat storage container 2.

Accordingly, even when a device (for example, a pump) for circulating the heat transport fluid functioning as the reaction medium, which is accommodated in the circulation system, is not used, the heat transport fluid functioning as the reaction medium can be smoothly circulated in the circulation system of the heat storage device 100 by capillary force of the first wick structure 17, a temperature difference between inside of the heat storage container 2 with a relatively high temperature, and inside of the condenser 106 with a relatively low temperature, and vapor pressure difference between the heat transport fluid functioning as the reaction medium inside the heat storage container 2 and the heat transport fluid functioning as the reaction medium inside the condenser 106.

Now, an operation example in a case where heat is stored in the heat storage container 2 will be described with reference to the components of the heat storage device 100 of FIG. 6. When heat is stored in the heat storage container 2, the first valve 103 of the heat storage device 100 is closed, the second valve 108 is opened, and the heat storage container 2 receives heat from external environment of the heat storage container 2. When the heat storage container 2 receives the heat from the external environment, the chemical heat storage material 12 releases the heat transport fluid functioning as the reaction medium, as reaction gas. The reaction gas released from the chemical heat storage material 12 passes through the first wick structure 17 or the second lid body 16 which is the porous body, and is released to an internal space of the heat storage container 2. The reaction gas released to the internal space of the heat storage container 2 is transported to the heat transport fluid container 101 through the second piping system 104, the condenser 106, and the third piping system 107.

The first valve 103 may be closed at a time point when a temperature of the heat storage container 2 reaches a predetermined heat release temperature, and the heat release temperature may be measured by a thermometer, or, may be determined, for example, from a time when the chemical heat storage material 12 releases heat, a time when a predetermined time elapses from start of heat release of the chemical heat storage material 12, a time when a predetermined amount of the liquid heat transport fluid L functioning as the reaction medium is returned to the heat transport fluid container 101, or a time when a heat release amount of the heat exchanger reaches a predetermined value.

In a case where heat storage of the heat storage container 2 is completed, not only the first valve 103 but also the second valve 108 is closed, and the liquid heat transport fluid L functioning as the reaction medium is confined inside the heat transport fluid container 101.

The second valve 108 may be closed in accordance with an accommodation amount of the liquid heat transport fluid L functioning as the reaction medium in the heat transport fluid container 101. As the accommodation amount of the fluid L functioning as the reaction medium, the accommodation amount of the liquid heat transport fluid L functioning as the reaction medium in the heat transport fluid container 101 may be measured. Additionally, the accommodation amount of the fluid L functioning as the reaction medium may be determined from a heat release time or a heat release amount of the chemical heat storage material 12, weight of the heat transport fluid container 101, a heat release amount of the condenser 106, an emission amount of the liquid heat transport fluid L functioning as the reaction medium from the condenser 106, or the like.

On the other hand, in a case where heat stored in the heat storage container 2 is transported from the heat storage container 2 toward the heat use destination, while the first valve 103 of the heat storage device 100 is opened and the liquid heat transport fluid L functioning as the reaction medium is supplied to the heat storage container 2, the second valve 108 is opened and the circulation system of the heat storage device 100 is opened, so that the heat storage device 100 is operated.

Figure 7:
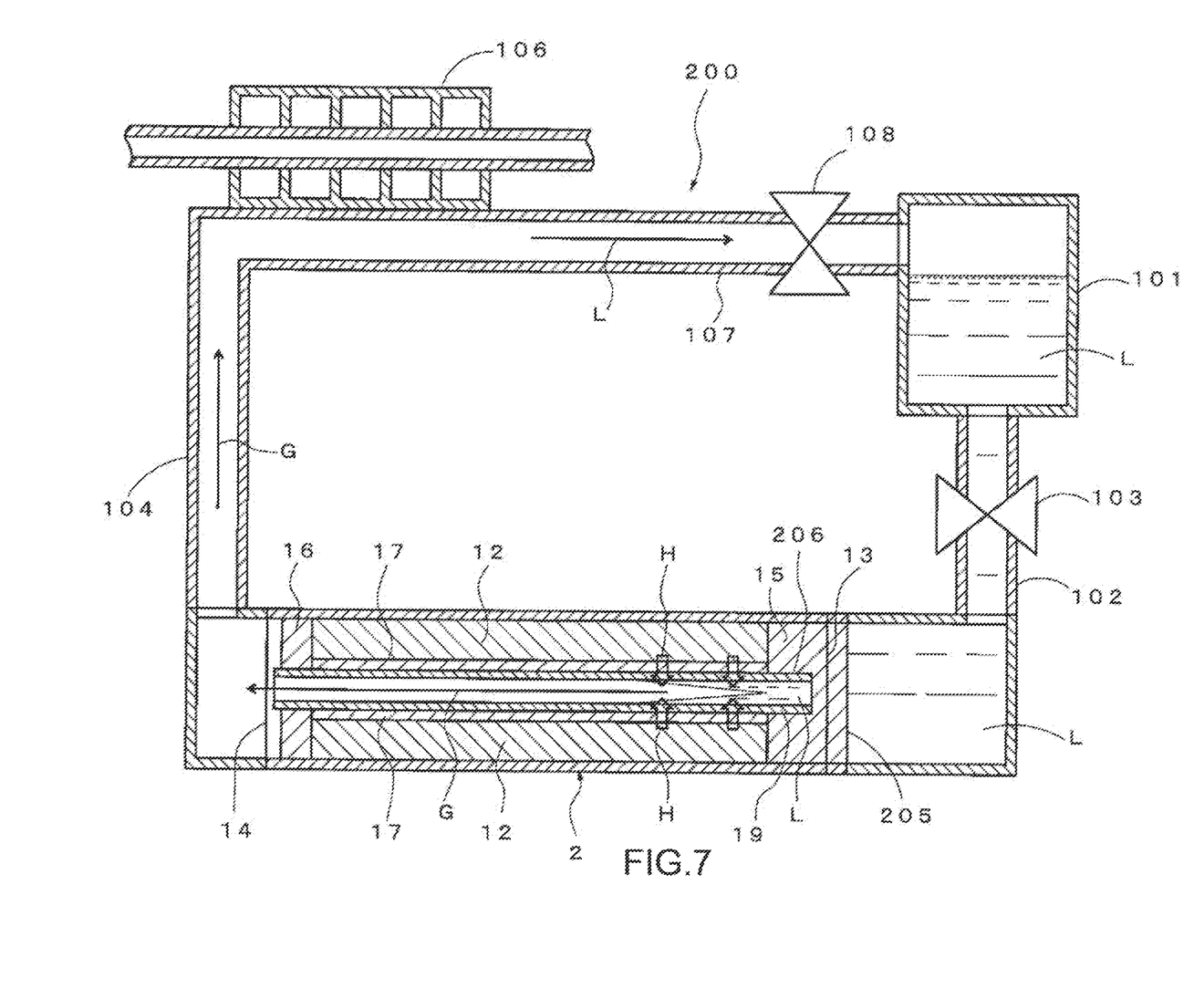
FIG. 7 is an explanatory view of a heat storage device according to a second embodiment of the present disclosure.

Now, a heat storage device according to a second embodiment of the present disclosure will be described with reference to the drawings. Description will be made while components identical with the component of the heat storage device 100 according to the first embodiment are denoted by the same reference numerals.

As illustrated in FIG. 7, in a heat storage device 200 according to a second embodiment, a partition wall 205 formed of a porous body, which is a backflow suppression member, is integrated with a first lid body 15 formed of a porous body of a heat storage container 2. That is, a hole portion 206 corresponding to a diameter of a shape of an inner tube 19 is formed in a radially central portion of the partition wall 205, and an end portion of the inner tube 19, and a vicinity of the end portion are inserted through the hole portion 206. Accordingly, the one open end portion of the inner tube 19 is blocked by the partition wall 205. Additionally, an external form of the partition wall 205 corresponds to a shape and an inner diameter of a first piping system 102, and the partition wall 205 is fitted in the first piping system 102, so that an inner surface of the first piping system and an outer peripheral surface of the partition wall 205 are in contact with each other. Accordingly, while a side close to the heat storage container 2 of the partition wall 205 functions as the first lid body 15, a side close to a heat transport fluid container 101 of the partition wall 205 separates an internal space of the heat storage container 2 and the first piping system 102.

In the heat storage device 200 according to the second embodiment, the partition wall 205 is located at a boundary portion between the heat storage container 2 and the first piping system 102. When a first valve 103 provided in the first piping system 102 is opened, even the partition wall 205 integrated with the first lid body 15 is impregnated in liquid heat transport fluid L functioning as a reaction medium, and therefore functions as a member for preventing backflow of vapor G of the heat transport fluid functioning as the reaction medium.

Now, an example of a warm-up device using the heat storage device of the present disclosure will be described. The heat storage container of the heat storage device is mounted on, for example, an exhaust pipe connected to an internal combustion engine (such as an engine) mounted on a vehicle, so that heat in exhaust gas that flows in the exhaust pipe can be stored in the heat storage container. The heat storage container is disposed such that an outer surface of the cylindrical body of the heat storage container is in direct contact with the exhaust gas that flows in the exhaust pipe, so that the heat storage container can be thermally connected to a heat source.

The heat derived from the exhaust gas, which is stored in the heat storage container, is transported from the heat storage container to the condenser in the circulation system of the heat storage device, and is further transported from the condenser to the warm-up device of the internal combustion engine which is a heat use destination.

Now, another embodiment of the present disclosure will be described. In the heat storage container 2 according to the second embodiment, the first wick structure 17 is a member such as a metal sintered compact formed by sintering a powdery metal material, and metal mesh. However, in place of this, a groove that is formed in the outer surface of the inner tube 19, and has capillary force may be employed. Additionally, in the heat storage container 3 according to the third embodiment, the second wick structure 20 is a member such as a metal sintered compact formed by sintering a powdery metal material, and metal mesh. However, in place of this, a groove that is formed in the inner surface of the inner tube 19 and has capillary force may be employed.

In the heat storage container 4 according to the fourth embodiment, the first wick structure 47 is a member such as a metal sintered compact formed by sintering a powdery metal material, and metal mesh. However, in place of this, a groove that is formed in the inner surface of the cylindrical body 11 and has capillary force may be employed. Additionally, in the heat storage container 4 according to the fourth embodiment, a second wick structure having a capillary structure may be further provided on the inner surface of the inner tube.

In each of the above embodiments, the radial cross-section of the cylindrical body 11 has a circular shape. However, the shape of the cross-section is not particularly limited, and may be, for example, an elliptic shape, a polygonal shape such as a triangular shape and a square shape, an oval shape, and a rectangular shape with round corners, or the like, in addition to a flat shape described above. Furthermore, in each of the above embodiments, the first lid body 15 and the second lid body 16 each are a porous body. However, in place of this, the first lid body 15 and the second lid body 16 each are a wick structure having a capillary structure.

In each of the heat storage containers 2, 3, 4 according to the second, third, and fourth embodiments, the first lid body 15 having the hole portion 15' is used. However, in place of this, similarly to the heat storage container 5 according to the fifth embodiment, a first lid body which does not have any hole portion may be used. In this case, a length of the inner tube is made to be suitably shorter than a length of each of the inner tubes 19, 49 of the heat storage container 2, 3, 4, so that the first lid body which does not have any hole portion can be disposed adjacent to the chemical heat storage material on the one end portion side of the cylindrical body.

The heat storage container 5 according to the fifth embodiment has a structure in which the first lid body 55 does not have any hole portion. However, in place of this, the heat storage container 5 may have a structure in which not only the first lid body 55 but also the second lid body does not have any hole portion.

In the heat storage container of each of the above embodiments, the number of the installed first wick structures is one. However, the installation number is not particularly limited, and a plurality of the first wick structures may be provided in accordance with a usage situation. Additionally, in the heat storage container of each of the above embodiments, the installation number of the flow channels provided inside the first wick structure is one. However, the installation number is not particularly limited, and a plurality of the flow channels may be provided in accordance with a usage situation.

In addition to a warm-up device for an internal combustion engine mounted on a vehicle, a usage method of the heat storage device of the present disclosure is not particularly limited. The heat storage device may be used for, for example, a heating device in a vehicle. Additionally, the heat storage device of the present disclosure may be used to recover, store, and utilize waste heat from an industrial plant. Furthermore, examples of another heat use destination of the heat storage device of the present disclosure can include an indoor heating device, a water heater, a dryer, and the like.

In each of the embodiments of the heat storage device, the heat storage container 2 according to the second embodiment is used. However, in place of this, the heat storage container according to the other embodiment may be used. In a case where the heat storage container 5 according to the fifth embodiment is used for the heat storage device, any partition wall for preventing backflow of vapor of heat transport fluid functioning as a reaction medium may not be provided.

It is possible to obtain a heat storage container capable of improving a heat generation amount and a heat transport amount with a simple configuration, and preventing collapse of a shape of a chemical heat storage material even when liquid such as water is used as a reaction medium, and a heat storage device capable of preventing backflow of a reaction medium vaporized inside a heat storage container even when the heat storage container using liquid such as water as a reaction medium is provided. Therefore, the heat storage container and the heat storage device each have a high utility value in a field of recovery, storage, and utilization of waste heat from an engine, an industrial plant, or the like, for example, in a field of recovering, storing, and utilizing waste heat by being mounted on a vehicle.

What is claimed is:

1. A heat storage container comprising:
   a tubular body;
   a chemical heat storage material accommodated in the tubular body;
   a first lid body comprising a central though hole, and is provided adjacent to the chemical heat storage material on a side of one end portion of the tubular body;
   a second lid body comprising a central through hole, and is provided adjacent to the chemical heat storage material on a side of another end portion of the tubular body;
   a first wick structure that is provided adjacent to inside of the chemical heat storage material between the first lid body and the second lid body, and has a capillary structure; and
   a flow channel that is provided inside the first wick structure, and penetrates the tubular body in a longitudinal direction,
   by a capillary force of the first wick structure, a liquid heat transport fluid being flow from the one end portion to the other end portion of the chemical heat storage material along a longitudinal direction of the tubular body,
   the liquid heat transport fluid functioning as a reaction medium to the chemical heat storage material and functioning as a heat transport fluid for transporting heat stored in the chemical heat storage material to a heat use destination,
   the first lid body and the second lid body central through holes each having such a size as to enable passing of the liquid heat transport fluid but not to allow passing of powder of the chemical heat storage material,
   wherein the first wick structure is metal mesh, or a metal sintered compact formed by sintering a powdery metal material, and wherein the liquid heat transport fluid is supplied to the one end portion of the chemical heat storage material through the first lid body, wherein one end portion of the first wick structure is in contact with an interior surface of the first lid body, wherein the central through hole of the first lid body forms one open end portion of the flow channel, and another end portion of the first wick structure is in contact with an interior surface of the second lid body, wherein the central through hole of the second lid body forms another open end portion of the flow channel, and wherein the liquid heat transport fluid is supplied from the first lid body to the second lid body through the first wick structure.

* * * * *